United States Patent
Reznik

[19]

[11] Patent Number: 6,158,504

[45] Date of Patent: Dec. 12, 2000

[54] RAPID COOLING APPARATUS

[76] Inventor: David Reznik, 12690 Viscaino Rd., Los Altos Hills, Calif. 94022

[21] Appl. No.: 09/407,241

[22] Filed: Sep. 28, 1999

[51] Int. Cl.[7] ............................... F28F 27/00; G05D 9/00
[52] U.S. Cl. ...................... 165/272; 165/104.21; 165/301
[58] Field of Search ................................ 165/96, 104.21, 165/272, 274, 293, 301, 302

[56] References Cited

U.S. PATENT DOCUMENTS

| | | |
|---|---|---|
| 2,996,898 | 8/1961 | Hosken et al. . |
| 4,502,286 | 3/1985 | Okada et al. .................... 165/104.21 X |
| 4,730,663 | 3/1988 | Volkl et al. . |
| 4,745,965 | 5/1988 | Katsura et al. ................. 165/104.21 X |
| 5,201,365 | 4/1993 | Siegel ............................. 165/104.21 X |
| 5,583,960 | 12/1996 | Reznik . |
| 5,607,613 | 3/1997 | Reznik . |
| 5,928,699 | 7/1999 | Reznik . |

Primary Examiner—Ira S. Lazarus
Assistant Examiner—Ljiljana V. Ciric
Attorney, Agent, or Firm—Darby & Darby

[57] ABSTRACT

Rapid cooling apparatus including a housing, a hot fluid coil disposed in the housing through which flows a product, a cooling liquid disposed in the housing which at least partially covers the hot fluid coil, and a condensing coil disposed in the housing through which flows a coolant, characterized by a reservoir in fluid communication with the cooling liquid in the interior of the housing, the reservoir being movable either towards the hot fluid coil and away from the condensing coil or towards the condensing coil and away from the hot fluid coil, so as to regulate a level of the cooling liquid which at least partially covers the hot fluid coil.

6 Claims, 2 Drawing Sheets

RAPID COOLING APPARATUS

FIELD OF THE INVENTION

The present invention relates to vacuum cooling of liquids generally and more particularly to rapid vacuum cooling of fluids which have been heat processed.

BACKGROUND OF THE INVENTION

In food processing, particularly processing of proteinaceous food products, the speed of cooling is exceedingly critical. Failure to cool a food product sufficiently quickly may lead to undesirable effects on the flavor, aroma, texture or other important characteristics of the food product.

There are known various methods for vacuum cooling hot liquids. U.S. Pat. No. 2,996,898 to F. J. Hosken et al. describes a vacuum cooling system for cooling produce that utilizes a refrigerated spray to condense the low pressure steam emanating from the produce. The system includes a liquid reservoir therein containing a liquid coolant supply. Refrigerant coils are immersed in the liquid coolant to produce more efficient heat transfer and prevent buildup of a block of ice on the coils.

U.S. Pat. No. 5,928,699 to Reznik, the disclosure of which is incorporated herein by reference, provides an improved rapid vacuum cooling system. The system comprises a housing, a hot fluid coil disposed in the housing through which flows a hot product, a cooling liquid disposed in the housing which fully covers the hot fluid coil, a vacuum pump operatively connected to an interior of the housing for reducing pressure in the housing until the cooling liquid boils and forms vapors, and a condensing coil disposed in the housing through which flows a cold fluid, the condensing coil condensing the vapors of the cooling liquid and thereby heating the cold fluid. The hot product transfers heat to the cooling liquid, helping it to boil.

SUMMARY OF THE INVENTION

The present invention seeks to provide improvements to the method and apparatus of U.S. Pat. No. 5,928,699. In U.S. Pat. No. 5,928,699, the temperatures of the coolant after passing through the condenser coil and the temperature of the product after passing through the hot fluid coil, are generally the same. This is not only because the mass flow rates are the same, but because the cooling liquid fully covers the hot fluid coil at all times.

In contrast, in the present invention, the cooling liquid does not fully cover the hot fluid coil at all times. Rather the level of the cooling liquid governs the final temperatures of the coolant and the warm product after passing through the condensing and hot fluid coils, respectively, and these final temperatures are not necessarily equal.

There is thus provided in accordance with a preferred embodiment of the present invention rapid cooling apparatus including a housing, a hot fluid coil disposed in the housing through which flows a product, a cooling liquid disposed in the housing which at least partially covers the hot fluid coil, and a condensing coil disposed in the housing through which flows a coolant, characterized by a reservoir in fluid communication with the cooling liquid in the interior of the housing, the reservoir being movable either towards the hot fluid coil and away from the condensing coil or towards the condensing coil and away from the hot fluid coil, so as to regulate a level of the cooling liquid which at least partially covers the hot fluid coil.

In accordance with a preferred embodiment of the present invention a vacuum generator is operatively connected to an interior of the housing for reducing pressure in the housing until the cooling liquid boils and forms vapors, wherein the condensing coil condenses the vapors of the cooling liquid and thereby transfers heat to the coolant.

Further in accordance with a preferred embodiment of the present invention an actuator is operatively connected to the reservoir which moves the reservoir, a temperature sensor is mounted in the housing, and a controller is connected to the temperature sensor and the actuator which controls sliding motion of the reservoir in accordance with a temperature sensed by the temperature sensor.

Still further in accordance with a preferred embodiment of the present invention a flexible tube fluidly connects the reservoir with the interior of the housing.

There is also provided in accordance with a preferred embodiment of the present invention a method for rapidly cooling a product, including providing rapid cooling apparatus including a housing, a hot fluid coil disposed in the housing through which flows a product, a cooling liquid disposed in the housing which at least partially covers the hot fluid coil, and a condensing coil disposed in the housing through which flows a coolant, and a reservoir in fluid communication with the cooling liquid in the interior of the housing, the reservoir being movable either towards the hot fluid coil and away from the condensing coil or towards the condensing coil and away from the hot fluid coil, and regulating a level of the cooling liquid which at least partially covers the hot fluid coil, thereby regulating transfer of heat from the product to the cooling liquid.

In accordance with a preferred embodiment of the present invention the method also includes regulating transfer of heat from the product to the cooling liquid by regulating a mass flow rate of the coolant through the condenser coil.

BRIEF DESCRIPTION OF THE DRAWINGS

The present invention will be understood and appreciated more fully from the following detailed description, taken in conjunction with the drawing in which.

DETAILED DESCRIPTION OF A PREFERRED EMBODIMENT

Figure 1:
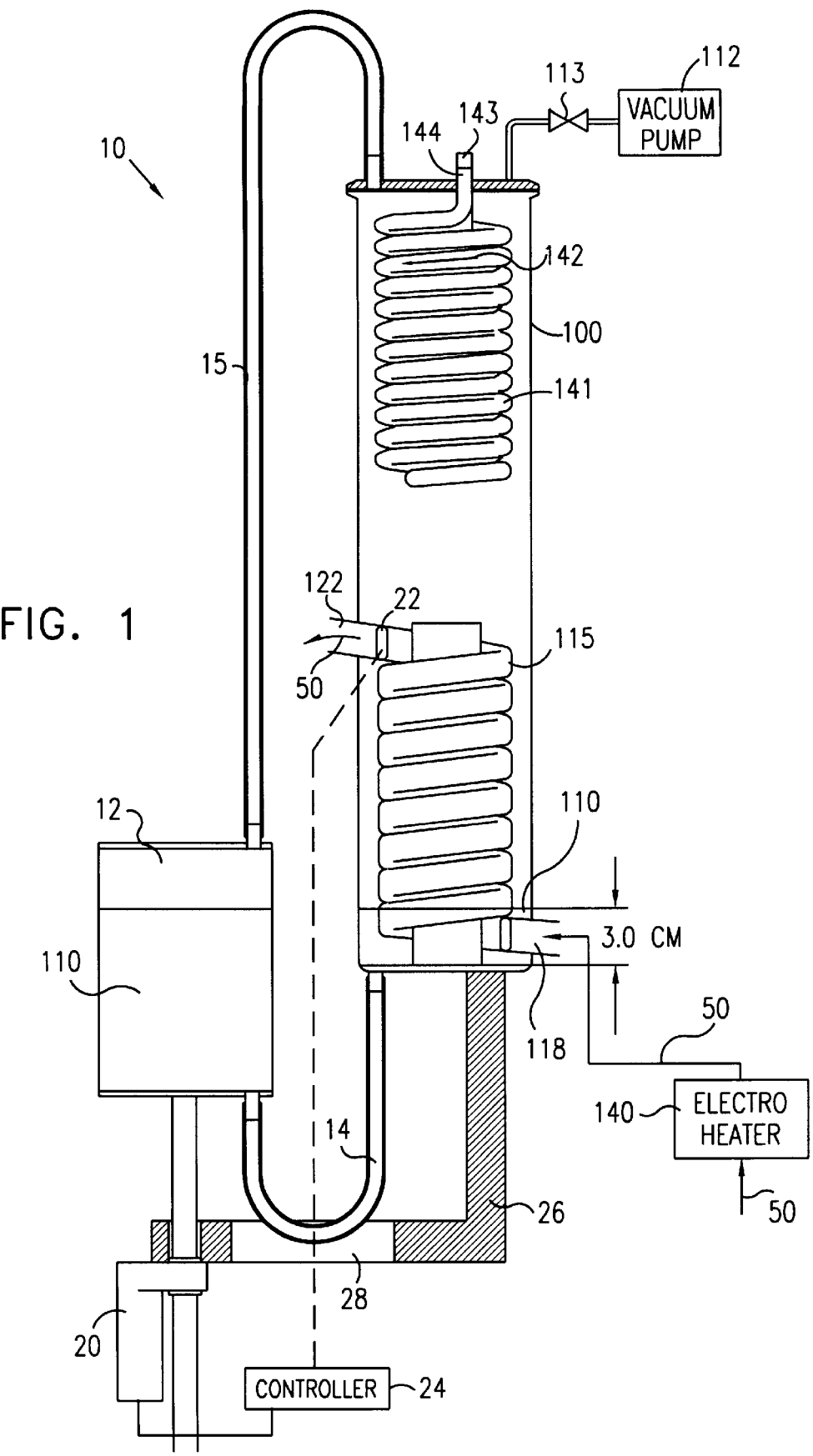
FIGS. 1 and 2 are simplified illustrations of rapid cooling apparatus constructed and operative in accordance with a preferred embodiment of the present invention, with two different levels of a cooling liquid covering a hot fluid coil.

Reference is now made to FIG. 1 which is a simplified illustration of a rapid cooling apparatus 10 constructed and operative in accordance with a preferred embodiment of the present invention.

Rapid cooling apparatus 10 preferably includes a thermally insulated housing 100, the interior of which is in communication with a vacuum pump 112 via a shut-off valve 113.

A hot fluid coil 115 is disposed in housing 100 and includes an inlet conduit 118 and an outlet conduit 122. A product 50 enters coil 115 at inlet 118 after being rapidly heated, typically in a fraction of a second, by an electroheater 140, and exits coil 115 at outlet 122, after being rapidly cooled to a lower temperature as will be described hereinbelow. A preferred electroheater is described in U.S. Pat. Nos. 5,607,613 and 5,583,960 of the present inventor, the disclosures of which are incorporated herein by reference.

Disposed at the top of the housing 100 is a condensing coil 141. A coolant 142 (e.g., cold cooling water) enters coil 141 through an inlet conduit 143 and exits at an outlet conduit 144. Inlet conduit 143 and outlet conduit 144 are both illustrated at the top of housing 100, but it is appreciated that they may be positioned at other places on housing 100.

Two pumps (not shown) are provided, one for pumping product 50 through electroheater 140 and coil 115, and another for pumping coolant 142 through condensing coil 141.

Rapid cooling apparatus 10 preferably includes a reservoir 12 in fluid communication with the interior of housing 100 such as by means of a flexible tube 14. Reservoir 12 preferably contains a cooling liquid 110, such as water, which can flow into the interior of housing 100 via flexible tube 14. Another flexible tube 15 is attached to an upper portion of reservoir 12 and housing 100. Flexible tube 15 ensures that the vacuum in housing 100 is maintained in reservoir 12 as well. Reservoir 12 is preferably slidingly mounted on a track (not shown). In FIG. 1, reservoir 12 is positioned with respect to hot fluid coil 115, such that cooling liquid 110 covers about 3.0 cm of hot fluid coil 115. It is seen that the upper level of cooling liquid 110 is the same in reservoir 12 and housing 100.

The height of cooling liquid 110 establishes the amount of surface area of coil 115 which is submerged in cooling liquid 110. The hot product 50 flows in coil 115 and gives off heat to cooling liquid 110. As a larger area of coil 115 is submerged in cooling liquid 110, more heat will be transferred from product 50 to cooling liquid 110, and consequently product 50 will be cooled more. Conversely, as a smaller area of coil 115 is submerged in cooling liquid 110, less heat will be transferred from product 50 to cooling liquid 110, and consequently product 50 will be cooled less.

Product 50 is rapidly cooled in the following manner. Product 50 flows in coil 115 and transfers heat to cooling liquid 110 by convection to the inner surfaces of coil 115, conduction through the coil wall and convection from the outer surfaces of coil 115 to cooling liquid 110. Prior to introduction of product 50 into coil 115, vacuum pump 112 reduces the pressure in the housing 100, until the cooling liquid 110 begins to boil. At the required vacuum condition, the shut-off valve 113 is closed and the operation is performed in a closed system. Once product 50 flows through coil 115, the relatively hot product 50 causes cooling liquid 110 to boil. The lowered pressure inside housing 100 enhances the boiling because the boiling point temperature of cooling liquid 110 is lower at the lower pressure. The enhanced boiling significantly enhances the convective heat transfer from product 50 to cooling liquid 110, as is well known in the art, and as a result, product 50 is rapidly cooled.

Vapors of the boiled cooling liquid 110 condense on the outer surfaces of condensing coil 141 and droplets of cooling liquid 110 fall back down to the lower section of housing 100.

The heat transferred to coolant 142 in condensing coil 141 is equal to the heat transferred from product 50 in hot fluid coil 115. In mathematical terms, for equal heat transfer areas and specific heats:

$$m_c(T_{c2}-T_{c1}) = m_h(T_{h1}-T_{h2})$$

wherein:

$m_c$=mass flow rate of coolant 142

$m_h$=mass flow rate of product 50

$T_{c1}$=temperature of coolant 142 before being heated in coil 141

$T_{c2}$=temperature of coolant 142 after being heated in coil 141

$T_{h1}$=temperature of product 50 before being cooled in coil 115

$T_{h2}$=temperature of product 50 after being cooled in coil 115

If the mass flow rates are equal, and coil 115 is fully submerged in cooling liquid 110, it is readily seen that $T_{c2}=T_{h2}$ and is the average of $T_{c1}$ and $T_{h1}$. For example, if the temperature of coolant 142 before being heated in coil 141 is 30° C. and the temperature of product 50 before being cooled in coil 115 is 90° C., then both coolant 142 and product 50 after passing through coils 141 and 115, respectively, will be at 60° C.

Even if the mass flow rates are unequal, and coil 115 is fully submerged in cooling liquid 110, $T_{c2}=Th_2$. For example, if the mass flow rate of coolant 142 is 3 times greater than that of product 50, and the temperature of coolant 142 before being heated in coil 141 is 30° C. and the temperature of product 50 before being cooled in coil 115 is 90° C., then the ΔT of coolant 142 will be 3 times less than that of product 50, i.e., coolant 142 will be heated by 15° C. to 45° C. and product 50 will be cooled by 45° C. to 45° C.

However, the level of cooling liquid 110 can be regulated so as to decrease the heat transfer at the hot fluid coil 115 such that the temperature of the coolant 142 after being heated in coil 141 is not the same as the temperature of product 50 after being cooled in coil 115. For example, for the level of cooling liquid 110 as shown in FIG. 1, the temperature of coolant 142 after being heated in coil 141 may be 40° C. (a rise of 10° C.), whereas the temperature of product 50 after being cooled in coil 115 may be 80° C. (a drop of 10° C.) for equal mass flow rates.

If the mass flow rates are unequal, and the level of cooling liquid 110 is as shown in FIG. 1, then the ΔT of coolant 142 will not be the same as the ΔT of product 50. For example, if the mass flow rate of coolant 142 is double that of product 50, then the temperature of coolant 142 after being heated in coil 141 may be 35° C. (a rise of 5° C.), whereas the temperature of product 50 after being cooled in coil 115 would still be 80° C. (a drop of 10° C.). In general, an increase in the mass flow rate of coolant 142 in coil 141 will cool product 50 faster and keep coolant 142 cooler, thereby increasing the efficiency of apparatus 10. Lowering the level of cooling liquid 110 is thus a more rapid and efficient method of heat transfer than prior art systems which only involve changing the mass flow rate of the coolant.

Figure 2:
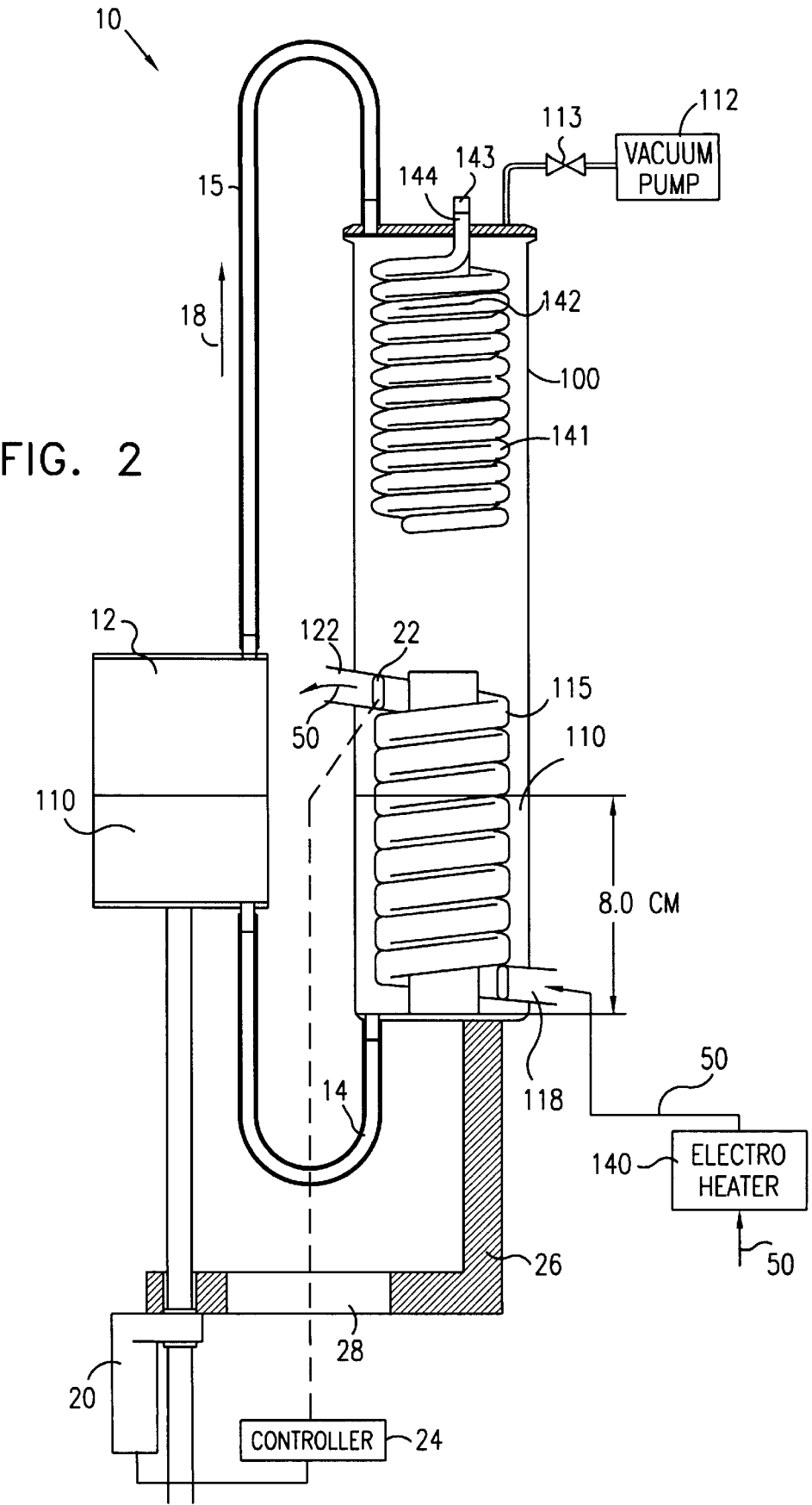

In FIG. 2, reservoir 12 has been moved generally in the direction of an arrow 18 and is now positioned at a higher point with respect to coil 115, such that cooling liquid 110 now covers about 8.0 cm of hot fluid coil 115. Again it is seen that the upper level of cooling liquid 110 is the same in reservoir 12 and housing 100. Thus reservoir 12 is movable towards/away from hot fluid coil 115 and away from/towards condensing coil 141, so as to regulate a level of cooling liquid 110 which at least partially covers hot fluid coil 115.

For example, for the level of cooling liquid 110 as shown in FIG. 2, the temperature of coolant 142 after being heated in coil 141 may be 45° C. (a rise of 15° C.), whereas the temperature of product 50 after being cooled in coil 115 may be 75° C. (a drop of 15° C.).

Preferably an actuator 20 is operatively connected to reservoir 12. For example, actuator 20 may be a servomotor and reservoir 12 may be mounted on a lead screw 21 of the servomotor. Actuator 20 is preferably mounted on a bracket 26 which is also attached to housing 100. Bracket 26 may have an aperture 28 formed therein for accommodating movement of flexible tube 14.

In addition, a temperature sensor 22 is preferably mounted at outlet conduit 122 so as to sense the temperature of product 50 exiting hot fluid coil 115. A controller 24 is preferably connected to temperature sensor 22 and actuator 20, so as to form a closed loop control system that controls the sliding motion of reservoir 12 in accordance with a temperature sensed by temperature sensor 22.

In summary, rapid cooling apparatus 10 can regulate the rapid cooling of product 50 by regulating the amount that coil 115 is submerged in cooling liquid 110 and/or by regulating the mass flow rate of coolant 142.

It will be appreciated by persons skilled in the art that the present invention is not limited to what has been particularly shown and described hereinabove. Rather the scope of the present invention includes both combinations and subcombinations of the various features described hereinabove as well as variations and development thereof which would naturally occur to a person of ordinary skill in the art upon reading the disclosure and which are not in the prior art.

What is claimed is:

1. Rapid cooling apparatus comprising:
   a housing;
   a hot fluid coil disposed in said housing through which flows a product;
   a cooling liquid disposed in said housing which at least partially covers said hot fluid coil; and
   a condensing coil disposed in said housing through which flows a coolant;
   characterized by a reservoir in fluid communication with said cooling liquid in the interior of said housing, said reservoir being movable either towards said hot fluid coil and away from said condensing coil or towards said condensing coil and away from said hot fluid coil, so as to regulate a level of said cooling liquid which at least partially covers said hot fluid coil.

2. Apparatus according to claim 1 and further comprising a vacuum generator operatively connected to an interior of said housing for reducing pressure in said housing until said cooling liquid boils and forms vapors, wherein said condensing coil condenses the vapors of said cooling liquid and thereby transfers heat to said coolant.

3. Apparatus according to claim 1 and further comprising:
   an actuator operatively connected to said reservoir which moves said reservoir;
   a temperature sensor mounted in said housing; and
   a controller connected to said temperature sensor and said actuator which controls sliding motion of said reservoir in accordance with a temperature sensed by said temperature sensor.

4. Apparatus according to claim 1 and further comprising a flexible tube which fluidly connects said reservoir with the interior of said housing.

5. A method for rapidly cooling a product, comprising:
   providing rapid cooling apparatus comprising:
      a housing;
      a hot fluid coil disposed in said housing through which flows a product;
      a cooling liquid disposed in said housing which at least partially covers said hot fluid coil; and
      a condensing coil disposed in said housing through which flows a coolant; and
      a reservoir in fluid communication with said cooling liquid in the interior of said housing, said reservoir being movable either towards said hot fluid coil and away from said condensing coil or towards said condensing coil and away from said hot fluid coil;
   and regulating a level of said cooling liquid which at least partially covers said hot fluid coil, thereby regulating transfer of heat from said product to said cooling liquid.

6. The method according to claim 5 and further comprising regulating transfer of heat from said product to said cooling liquid by regulating a mass flow rate of said coolant through said condenser coil.

* * * * *